Patented June 10, 1947

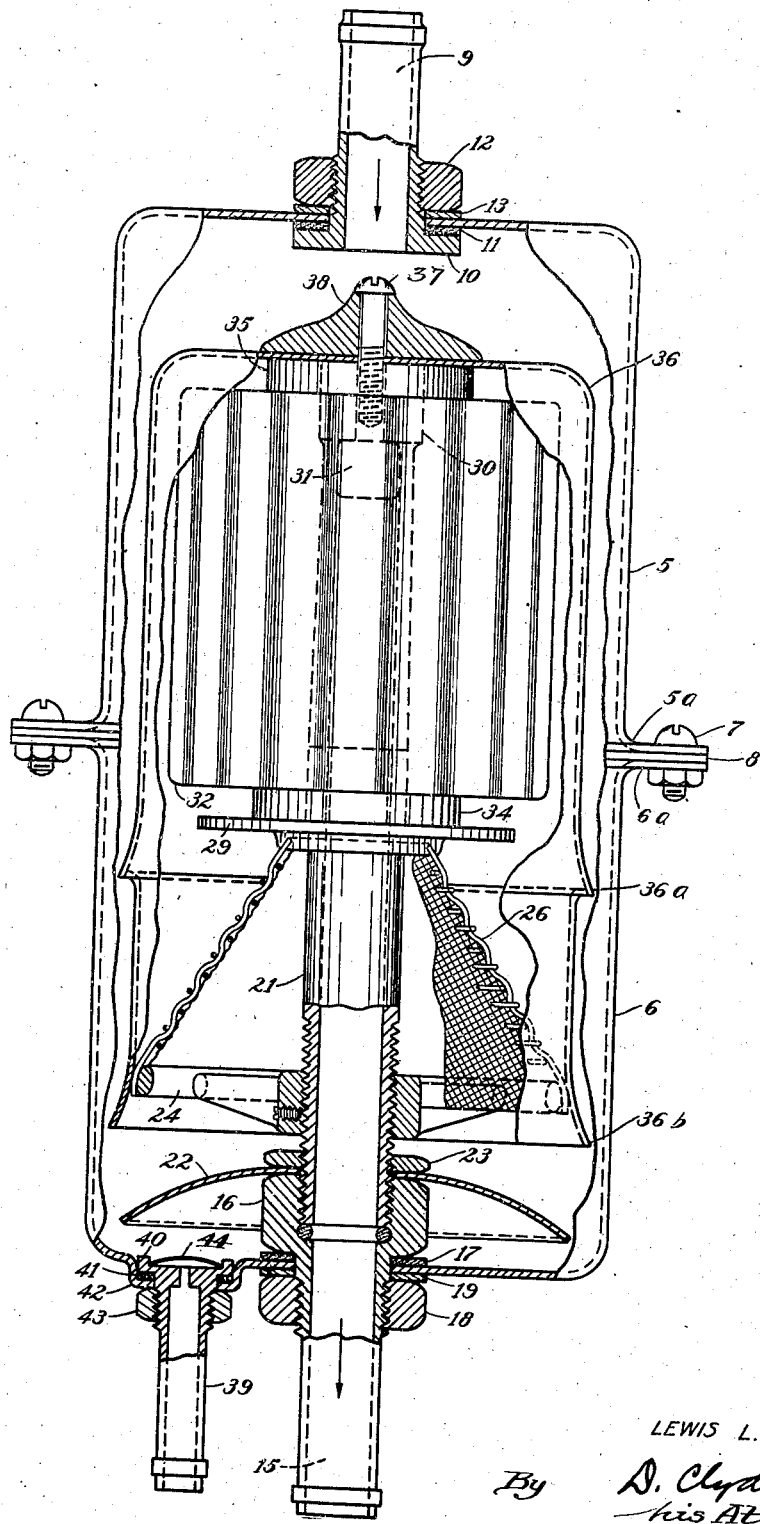

2,421,776

UNITED STATES PATENT OFFICE 2,421,776

FILTER DEVICE

Lewis L. Dollinger, Rochester, N. Y., assignor to Staynew Filter Corporation, Rochester, N. Y., a corporation of New York Application March 24, 1943, Serial No. 480,395

2 Claims. (Cl. 183—65)

This invention relates to filters and more particularly to pipe line filters.

In many installations, it is essential that foreign matter be removed from a fluid moving through a conduit. The fluid may be air from which it is desired to remove oil, water vapor, dust or powder, or the fluid may be oil from which it is necessary to remove pipe scale and the like. More specifically, on certain aeroplanes it is customary to supply air under pressure to parts thereof. This air is conveniently driven by a pump lubricated by oil introduced therein which oil becomes dispersed through the discharged air. It is, therefore, essential to separate the oil from the driven air and to return the recovered oil to the pump for further lubrication uses.

The main feature of the present invention relates to a conduit or pipe line filter which comprises a minimum number of parts and yet is highly efficient in operation. Another feature of the invention relates to a pipe line filter of such novel construction and compactness that it can be used on an aeroplane to insure a supply of air under pressure with substantially all of the oil and water vapor removed therefrom.

Other features and advantages of the invention will appear from the detailed description and claims when taken with the drawing in which the single figure is a front elevation partially in section of the present filter device.

The filter device of the present invention has a cylindrical filter housing comprising the cup-shaped sections or shells 5 and 6, the rims of which project outwardly as annular flanges 5a and 6a. These flanges are perforated to receive bolts 7 which clamp the flanges together with a gasket 8 interposed therebetween to insure an air-tight joint. The housing sections are made of a good heat conducting material, such as aluminum and have their inner surfaces highly polished so that oil globules or other particles, whether liquid or dry, will readily flow thereover.

The closed end of the section 5 is provided with a central opening to receive the stem of an intake nipple 9. This stem has a threaded intermediate portion and terminates at one end in an annular flange 10. This flange is adapted to be drawn against a gasket 11 in contact with the inner surface of the shell, by means of the nut 12 and lock washer 13 engaging the outer surface of the shell, so that the nipple makes an air-tight joint with the housing.

The end of the section 6 is likewise provided with a central opening to receive the threaded stem of an outlet nipple 15. This nipple terminates at one end in a head 16 which is drawn against a gasket 17 in contact with the inner surface of the section 6, by means of a clamping nut 18 and lock washer 19 threaded on the stem of the nipple. Thus the outlet nipple also has an airtight connection with the housing.

The head 16 of the outlet nipple has an opening therethrough and is internally threaded to receive the end of the threaded portion of a tubular support 21 which extends coaxially of the housing toward the inlet nipple 9. The mentioned portion of the support passes through the central aperture in a circular plate or baffle 22 which is preferably dished to flare toward the end and side of the section 6. A nut 23 threaded on the support anchors the baffle in position against the head 16. On the threaded portion of the support above the mentioned baffle 22, there is mounted a spider ring 24. This ring snugly engages the inner periphery of the large end of a porous frusto-conical diaphragm 26 which is symmetrically mounted around the tubular support. The diaphragm includes a frusto-conical support of screen material made preferably of hot galvanized steel wire, and a covering therefor of copper mesh. The upper edge of the diaphragm snugly engages the under surface of an annular flange 29 preferably formed integral with the support, the diaphragm being clamped in this position by the spider ring. While the diaphragm is herein illustrated as having sides of steep slope, it will be understood that the diaphragm may be made shallow until it becomes virtually flat. The tubular support which terminates in a closed cylindrical head 30, is provided adjacent this head with rectangular openings 31 in the opposing side walls thereof to communicate with the passage through the support. The portion of the support above the annular flange 29 extends through a filter unit or insert 32.

The filter insert 32, which is generally cylindrical, comprises felt fabric that has been accordion-pleated to provide radiating pockets, supported on correspondingly-shaped radial fins of wire screening and opening only toward the center of the unit. The resulting openings at each end of the filter insert are bounded by felt rings 34 and 35, each having one surface thereof sealed to one of the common ends of the series of pockets. When the filter insert is mounted on the tubular support, as shown, the felt ring 34 engages the upper surface of the annular flange 29, while the upper felt ring 35 of the filter is adapted to engage snugly the inner surface of a bell-shaped deflector 36 to insure that substantially all of the air or gas entering the housing will pass through the porous side walls of the filter insert 32 before being discharged through the outlet nipple 15.

The deflector 36, which encloses the filter insert 32 and the diaphragm 26 to contact the latter at the spider ring 24, is axially mounted on the head 30 of the support by a suitable screw 37 which passes through a washer 38 and is threaded into the head of this section. The washer 38 has a contour similar to that shown, for the purpose of guiding the air stream without turbulence which would result if the incoming air struck a flat surface. The length of the tubular support is such that the closed end of the deflector is positioned adjacent the point where the intake nipple 9 discharges into the housing. The deflector, due to its axial mounting is symmetrically positioned with respect to the cylindrical wall of the housing and defines therewith an annular passage. It will be noted that the deflector flares outwardly at points 36a and 36b so that the cross sectional area of the mentioned passage at these points, is approximately equal to cross sectional area of the passage through the intake nipple 9.

The closed end of the housing section 6 is also provided with a discharge nipple 39 preferably extending in the same direction as the outlet nipple 15. The nipple 39 has a flange 40 engaging a gasket 41 both of which rest in a depression 42 in the end of the housing section 6. A nut 43, in threaded engagement with the stem of this nipple, draws the flange 40 and gasket 41 into leak-proof relation with the mentioned section. If desired, a strainer 44 may be mounted on the flange 40 to cover the entrance to the bore through the nipple 39. The bore through the nipple 39 is of restricted diameter so that only a limited amount of air can escape therethrough along with the collected oil.

In the operation of the present filter device, air at a temperature of 200° F. and contaminated with oil or the like, is supplied at a velocity of about ten thousand feet per minute through a conduit (not shown), to the intake nipple 9. The air passing through this nipple flows into the housing where it is caused by the deflector 36, to stream at high velocity through the annular passage along the polished, inner side wall of the housing. The flaring portions 36a and 36b of the deflector insure that the air is repeatedly thrown, as if by centrifugal action, toward the mentioned wall of the housing. Since this wall is made of good heat conducting material, it absorbs heat from the stream of air thereby cooling it so that oil globules accumulate on the inner surface of the housing. Inasmuch as this surface is polished, the oil globules flow toward the bottom of the housing to be discharged through oil nipple 39 for further recirculation and use. The baffle 22 prevents any accumulated oil at the bottom of the housing, from coming into contact with the flowing stream of air during normal operation, thereby preventing any of this accumulated oil from being taken up again by the stream of air. Also, the baffle prevents the accumulated oil from reaching the diaphragm 26 in the event that the filter is inverted temporarily during the flight of the aeroplane.

After the stream of air advances through the annular passage to a point beyond the deflector 36, this stream expands and reverses its course, thereby reducing the velocity of the air stream and cooling the air as well as causing more oil to be deposited. The stream, after reversing its course, flows through the diaphragm which insures that there will be a uniform distribution, per unit area, of air entering and emerging from the diaphragm. Also, further increments of the separated oil accumulate on the mesh of the diaphragm to drop eventually to the bottom of the housing. After leaving the diaphragm, the stream of air flows through the myriads of pores in the filter insert, on the outer fin surfaces of which substantially the last vestige of oil or the like collects. The filtered air, after passing through the fabric of the filter insert, flows through the rectangular openings 31 in the tubular support and through the passage in this support, to the outlet nipple 15.

The filter insert or unit 32 may vary widely in construction, however, it can conveniently be made in accordance with the disclosure of Dollinger Patent 1,580,291, granted April 13, 1926.

The construction of the present filter device insures that there is a minimum impedance to the flow of air therethrough and further insures that there is minimum turbulence in the air stream. This results in a maximum delivery of filtered air which is substantially free from oil and water vapor.

While the filter device of the present invention has been described with particular reference to filtering oil and the like from air to be used in connection with an aeroplane, it should be understood that this device is not limited to that use but is applicable in filtering foreign matter from fluids, whether liquids or gases, as they move through conduits.

What I claim is:

1. In a filter, a housing provided with an inlet and with an outlet, a bell-shaped deflector having its closed end mounted in spaced relation with respect to the inlet and with its open end directed toward said outlet, a porous conical diaphragm having the base thereof in peripheral engagement with the margin of said deflector and having its apex directed toward the deflector to define therewith a closed compartment, said diaphragm being mounted coaxially of said deflector, a hollow filter unit having radiating fins mounted in said deflector coaxially therewith between the conical diaphragm and the closed end of the deflector, and tubular means connecting the interior of the filter unit with said outlet.

2. In a filter, a housing provided with an inlet and with an outlet, a bell-shaped deflector having its closed end mounted in spaced relation with respect to the inlet and with its open end directed toward said outlet, a porous conical diaphragm having the base thereof in peripheral engagement with the margin of said deflector and having its apex extending into the deflector to define therewith a closed compartment, said diaphragm being mounted coaxially of said deflector, a hollow filter unit having radiating fins mounted in said deflector coaxially therewith between the conical diaphragm and the closed end of the deflector, and tubular means connecting the interior of the filter unit with said outlet.

LEWIS L. DOLLINGER.

REFERENCES CITED

The following references are of record in the file of this patent:

UNITED STATES PATENTS

| Number | Name | Date |
| --- | --- | --- |
| 1,311,573 | Newburgh | July 29, 1919 |
| 1,925,373 | Davies | Sept. 5, 1933 |
| 841,984 | Kenney | Jan. 22, 1907 |
| 1,830,095 | Dollinger | Nov. 3, 1931 |

FOREIGN PATENTS

| Number | Country | Date |
| --- | --- | --- |
| 291,980 | Germany | May 18, 1916 |